UNITED STATES PATENT OFFICE.

MARK W. MARSDEN, OF PHILADELPHIA, PENNSYLVANIA.

METHOD OF UTILIZING SPANISH MOSS.

1,327,873.     Specification of Letters Patent.     Patented Jan. 13, 1920.

No Drawing.     Application filed July 18, 1918. Serial No. 245,576.

*To all whom it may concern:*

Be it known that I, MARK W. MARSDEN, a citizen of the United States, residing at Philadelphia, in the county of Philadelphia and State of Pennsylvania, have invented certain new and useful Improvements in Methods of Utilizing Spanish Moss, of which the following is a specification.

This invention relates to the utilization for industrial purposes of a moss which grows upon trees, bushes, etc., known in botany as *Polytrichum commune* or tree moss (commonly called Spanish moss) which is native in Louisiana, Texas, Arkansas, Mississippi and generally abundant throughout the Southern States, but principally in the sugar and rice producing regions. Its only value heretofore has been the product, similar in appearance to horse hair, used for filling mattresses and the like, which results from retting or reducing the moss to a hairy material by burying it in a swamp and rotting away the objectionable matters. This treatment requires several months and is otherwise expensive and frequently results in an inferior and objectionable product.

I have discovered that this moss abounds in sugarjuices or carbohydrates, which it derives principally from the absorption of carbon dioxid and other elements of the atmosphere, which produce or form from natural elements sugars and other chemical constituents in combination all of which are commercially valuable when separated and reduced to proper form. I have also discovered that the solid matter or cellular portion after the elimination of the extractive has an unusually strong affinity for nitrates and hence affords an admirable base for explosives.

Without limiting myself to the exact details thereof, I have found in practice the following method to be economical and otherwise eminently suitable for the recovery of the sugar and kindred chemical constituents; the recovery of the cellular matter, which is susceptible to manifold uses, such as conversion into gunpowder, artificial silk, etc.; and for the recovery of the vegetable hair previously alluded to.

The moss is first washed in clear water in order to remove the dirt and incrusting matter, after which I prepare a dilute solution of sulfuric acid or its equivalent. For example, one half ounce, more or less, of acid to each gallon of water. A density of about 66 degrees Baumé, more or less, gives good results. This quantity of solution is sufficient to treat from eight to ten ounces of the prepared moss. The solution with the moss added is boiled for from three to six hours, more or less, or until the soluble matters are dissolved and the carbohydrates have been converted into sugar. The extractive or liquor is then drained off and concentrated or otherwise treated in the well known manner for the separation and recovery of the sugar, alcohol and other valuable chemicals. The residue, which I recover by straining or precipitating before concentration, is in the form of cellular matter, which after subjection to any of the well known and approved methods may be converted into gunpowder, artificial silk, etc. It is especially adapted and valuable as a base for explosives owing to its susceptibility to nitration, which, as indicated, is also contemplated by the invention. Any approved method of nitration may be employed.

The hair-like product, which remains after the removal of the extractive including the soluble cellular matter is boiled in a solution of soap and glycerin or their equivalent and subsequently washed and dried. The product of this treatment is characterized by its soft and springy nature and being absolutely sanitary is admirably adapted as a filling or stuffing for mattresses, pillows and the like.

Having described the nature and objects of the invention I claim:—

1. That improvement in the method of treating Spanish moss, which consists in dissolving and removing the extractive, subjecting the residue of the stock to boiling in a solution of soap and glycerin, and finally washing and drying the product.

2. A stuffing or filling for mattresses and the like, characterized by its soft and springy nature, and consisting of the hair product of Spanish moss from which the extractive has been removed, said product being treated with a solution of soap and glycerin and finally washed and dried.

In testimony whereof I affix my signature.

MARK W. MARSDEN.